No. 734,086. PATENTED JULY 21, 1903.
F. R. PACKHAM.
SEED TUBE CONNECTION FOR GRAIN DRILLS.
APPLICATION FILED APR. 30, 1903.
NO MODEL.
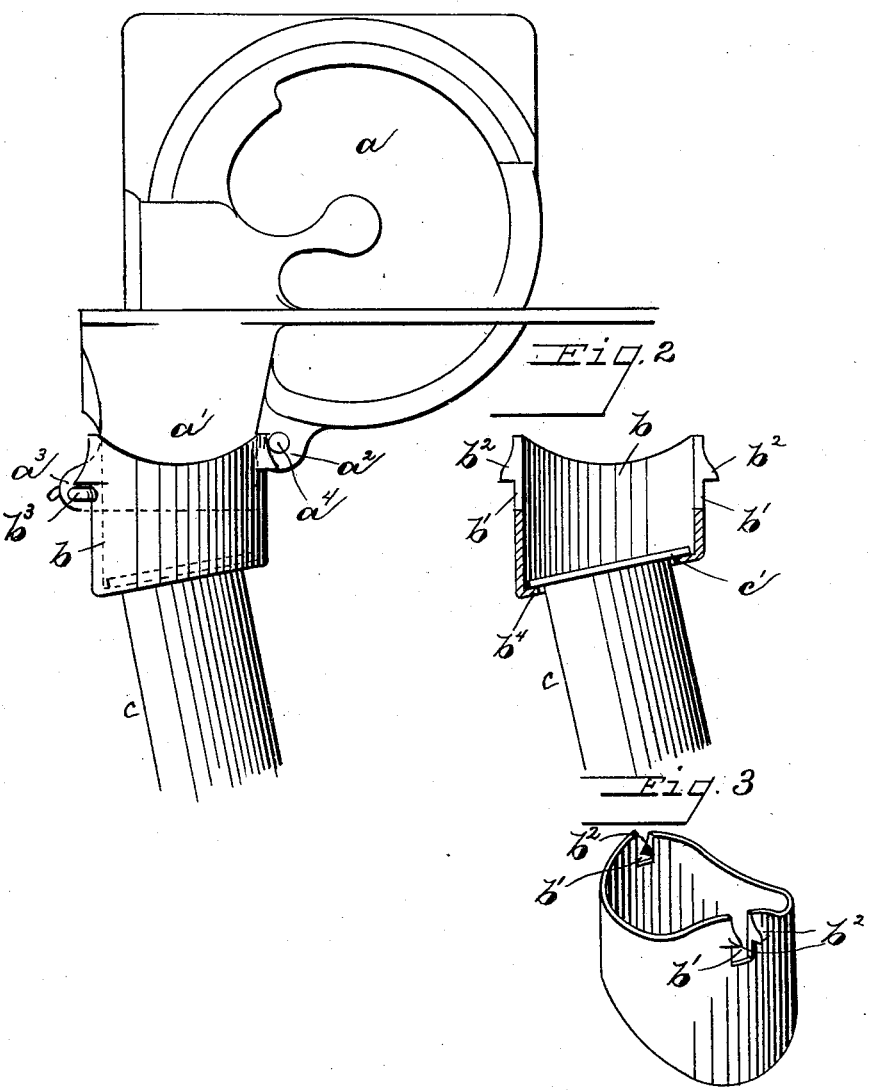
WITNESSES:
T. Llewellyn Walker
Clifton P. Grant
INVENTOR
Frank R. Packham
BY
Staley & Bowman
ATTORNEYS No. 734,086. Patented July 21, 1903.

UNITED STATES PATENT OFFICE.

FRANK R. PACKHAM, OF SPRINGFIELD, OHIO, ASSIGNOR TO AMERICAN SEEDING MACHINE COMPANY, OF JERSEY CITY, NEW JERSEY, A CORPORATION OF NEW JERSEY.

SEED-TUBE CONNECTION FOR GRAIN-DRILLS.

SPECIFICATION forming part of Letters Patent No. 734,086, dated July 21, 1903.

Application filed April 30, 1903. Serial No. 154,944. (No model.)

*To all whom it may concern:*

Be it known that I, FRANK R. PACKHAM, a citizen of the United States, residing at Springfield, in the county of Clark and State of Ohio, have invented certain new and useful Improvements in Seed-Tube Connections for Grain-Drills, of which the following is a specification.

My invention relates to seeding-machines, and more particularly to improved connections from the grain-distributers to the conductor-tubes. Heretofore the conductor-tubes have been made of flexible materials, which are easily collapsible, or spiral-wire tubes have been used, which in bending open between the coils and permit the escape of grain, and various means have been employed to attach these flexible tubes to the grain-distributers.

The object of my invention is to provide means to attach non-collapsible tubes to the discharge-opening of the grain-distributers in such manner that the tubes are free to work in all directions, the connection being in the nature of a universal coupling, so formed that upon the lifting of the tubes the upper end of the tubes will contact with the lower end of the walls of the distributer-discharge, which are amply strong to sustain the shock, and the connections or couplings are entirely relieved of the strains incident to the rising of the tubes.

A further object is to provide a simple and efficient connection easily attached with means to prevent its rotation and adapted for use in seeding-machines having front and rear rank furrow-openers.

My invention consists of the constructions and combinations of parts hereinafter described, and set forth in the claims.

In the accompanying drawings, Figure 1 is a side view of a grain-distributer having a discharge-opening, conductor-tube, and connection embodying my invention. Fig. 2 is a sectional view of the coupling, showing the upper end of the grain-tube resting therein; and Fig. 3 is a perspective view of the coupling.

Like parts are represented by similar letters of reference in the several views.

In the drawings, $a$ represents a grain-distributer having a discharge $a'$ therefrom, the walls of which are provided with lugs $a^2$ and $a^3$. The walls of the distributer are usually made in halves and riveted together, and the lugs $a^2$, with the rivet $a^4$, in the drawings are for this purpose.

It will be understood that the lugs $a^2$ are not essential to my improvement, but form additional means of preventing the rotation of the coupling, as will hereinafter appear.

A coupling $b$, having oppositely-disposed slots $b'$ formed in its upper end, is also provided with outwardly-extending projections $b^2$. When in place on the discharge end of the distributer, the slots $b'$ embrace the lugs $a^2$ and $a^3$, which prevents the turning or rotation of the coupling; but, as heretofore pointed out, the lugs $a^3$ are sufficient for this purpose, the engagement with the lugs $a^2$ simply affording an additional stop to prevent the turning of the coupling. A cotter $b^3$, inserted through a perforation in the lugs $a^3$, extends under the projections $b^2$ and holds the coupling in position on the distributer-discharge. The distributer-discharge extends sufficiently within the coupling so that the engagement of the cotter upon one side of the coupling is sufficient to sustain it in position. Any suitable universal-joint connection may be employed between the conductor-tubes $c$ and the coupling; but I have preferably shown the tubes with an outwardly-projecting flange $c'$ at their upper ends, adapted to rest upon an inwardly-projecting flange $b^4$ at the lower end of the coupling. The chamber in the coupling is of sufficient dimensions to permit play of the upper end of the tube therein and thereby allow the tube to turn in different directions to compensate for variations in movement incident to use in practical operation. It will be seen the construction is such that when the tube is forced upwardly its upper end will contact with the lower end of the distributer-discharge, which is amply strong to withstand the stroke, and the coupling is thereby relieved of the shocks and strains that so frequently in the old constructions broke the parts. The lower end of the coupling I preferably form at an inclined angle, as shown in the drawings, and by reason of the slots $b'$ and projections $b^2$ being provided on opposite sides of the coupling it can be turned one-half around and fastened by the cotter, so that the tubes will be given an inclination to the front or rear for use in drills having front and rear rank furrow-openers; but it is obvious that when the zigzag arrangement is not required the lower end of the coupling can terminate at right angles to its axis.

Having thus described my invention, I claim—

1. The combination with a grain-distributer and a seed-tube, of a coupling for said distributer and tube having a universal joint with said tube, and means to hold said coupling in a fixed position on said distributer.

2. The combination with a grain-distributer and a non-collapsible seed-tube, of a coupling to connect said distributer and tube having a universal joint to said tube, formed to normally hold said tube in oppositely-inclined positions, and means to fix said coupling in either position.

3. The combination with a grain-distributer and non-collapsible seed-tube, of a coupling for said distributer and tube formed to loosely hold and permit said tube in rising to contact with said distributer and relieve the coupling from the shock.

4. The combination with a grain-distributer and non-collapsible seed-tube, of a coupling to connect said distributer and tube, having a universal joint with said tube formed to sustain and permit said tube in rising to contact with said distributer and relieve the coupling from the shock.

5. The combination with a grain-distributer having a perforated lug thereon and a seed-tube, of a coupling to connect said distributer and tube having a slot in the wall thereof and lateral projections adjacent to said slot, and a cotter extending through said perforation and under said projections to hold said coupling in place on said distributer.

6. The combination with a grain-distributer having a perforated lug thereon, and a seed-tube having an outwardly-extending flange at its upper end, of a coupling to connect said distributer and tube, said coupling having oppositely-disposed slots in the upper end thereof adapted to engage said lug, lateral projections adjacent to said slots, an inwardly-projecting inclined flange at the lower end of said coupling upon which said tube-flange rests, and a cotter extending through said perforated lug and under the projections adjacent to the slot that is in engagement with said lug.

In testimony whereof I have hereunto set my hand this 28th day of April, A. D. 1903.

FRANK R. PACKHAM.

Witnesses:
OLIVER H. MILLER,
PERCY NORTON.